United States Patent [19]

Haazebroek

[11] 4,228,211

[45] Oct. 14, 1980

[54] DRY TRANSFER MATERIAL

[75] Inventor: Arnold Haazebroek, Etten Leur, Netherlands

[73] Assignee: Grafische Onderneming Mago B.V., Blaricum, Netherlands

[21] Appl. No.: 945,708

[22] Filed: Sep. 22, 1978

[51] Int. Cl.[2] .......................... B32B 3/18; B41M 3/12; B44C 1/16

[52] U.S. Cl. .................................... 428/203; 156/240; 428/204; 428/207; 428/211; 428/354; 428/355; 428/513; 428/523; 428/914

[58] Field of Search ................. 156/64, 234, 240, 278; 427/147; 428/195, 201, 203, 204, 207, 343, 353-355, 913, 914, 211, 513, 523

[56] References Cited

U.S. PATENT DOCUMENTS

| | | | |
|---|---|---|---|
| 3,298,850 | 1/1967 | Reed et al. | 428/914 X |
| 3,741,787 | 6/1973 | Tordjman | 156/234 X |

*Primary Examiner*—Bruce H. Hess

*Attorney, Agent, or Firm*—Browdy and Neimark

[57] ABSTRACT

A dry transfer material is provided on a transparent polyalkylene which is coated with a varnish layer, printing ink layers forming an image mirror of the desired image, a second varnish layer and an adhesive layer, said adhesive layer extending beyond the contours of the varnish and image layers, wherein the adhesive layer contains a primer for said polyalkylene due to which the adhesion of the adhesive to the transparent substrate is greater than the cohesion in the adhesive layer so that during transfer of the image the adhesive layer breaks around the contours of the varnish.

8 Claims, No Drawings

DRY TRANSFER MATERIAL

This invention relates to a material to be used for a so-called dry transfer process, hereinafter called "dry transfer material" for the sake of brevity, and more particularly to such a material which contains a transparent polyalkylene film as the temporary support for the image layers.

Dry transfer materials are well-known and are used on a large scale, both in the graphical and in the industrial field. In this lastmentioned field they are used for example for applying signs to vehicles, tools or advertisement-boards. Of course, the principles of the transfer process are the same in both fields, but in the industrial field the requirements for the transferred signs are higher, since they often have to withstand outdoor conditions. It is also known to use transparent supports in such dry transfer materials, especially in materials used in the graphical field. However, polyalkylenes, such as polyethylene, polypropylene, and ethylene-propylene copolymers, which are very useful transparent materials, especially for use in the industrial field, up till now presented a special problem. These polymeric materials show a poor adherence to other materials, a problem which is well-known per se. After the image layers, usually consisting of a sandwich of two transparent varnish layers with between them the colored layers forming the desired image have been applied to the polyalkylene support, an adhesive is applied for bonding the image to the final substrate. Now the cohesion of such an adhesive is greater than its adhesion to the polyalkylene support, which means that during the transfer process any adhesive in contact with the polyalkylene will also be transferred. The consequence of this phenomenon is that a good product could only be obtained, if the contours of the adhesive exactly correspond to those of the image sandwich. If the contours of the adhesive layer lie within those of the sandwich, one or more edges of the sandwich will not be adhered to the final substrate so that no satisfactory result of the transfer process is obtained. If, on the other hand, the circumference of the adhesive layer lies outside that of the sandwich, the entire adhesive layer will be transferred during the transfer process so that the final substrate will contain sticky parts outside the borderline of the image, which is of course unacceptable. However, in practice it is not possible to attain the required exact correspondence between the circumferences of the adhesive layer and the sandwich, at least not in an economically feasible way.

Quite unexpectedly it has now been found that it is possible to modify the adhesive in such a way that its adhesion to the polyalkylene support is greater than the cohesion within the adhesive layer which makes it possible to make the circumference of the adhesive layer to extend beyond that of the sandwich without the occurrence of sticky spots on the definitive substrate after transfer of the image.

Accordingly, it is an object of the invention to provide an improved adhesive for use in dry transfer materials.

A further object of the invention is to provide a dry transfer material with the use of such a modified adhesive.

A still further object of the invention is to provide a transfer process using said improved dry transfer material.

Further objects and advantages will appear from the following description.

According to the invention the adhesive is modified by incorporating therein a minor amount, i.e. 1 to 5%, based on the used adhesive composition, of a primer for the polyalkylene.

The support for the dry transfer material according to the invention is a film or sheet of polyethylene, polypropylene, or an ethylene-propylene copolymer. Also a sheet of cellulosic material, such as paper or paperboard, coated on one side with such a polymer, may be used. Also there are commercially available sheets of polypropylene or polyethylene which on one side are coated with an anti-blocking layer, usually on polysiloxane basis.

To the or an uncoated side of this support the various coating layers are now applied, usually by screen-printing. All this is done in the usual way, i.e. first a transparent varnish layer is applied, thereafter one or more layers of colored varnish, depending on the desired color and pattern of the image, and then again a transparent varnish layer. The two transparent varnish layers extend somewhat beyond the contours of the inner layers, as is generally done.

Then the adhesive is applied and the novel feature of this invention resides in the composition of the adhesive agent. It has been found that by incorporating a minor amount of primer for the polyalkylene in the adhesive composition, the adhesion of the dried adhesive to the support is greater than the cohesion within the adhesive layer, so that during transfer of the image to the final substrate the adhesive layer will break along the contours of the transparent varnish layer with the result that the desired image is adhering to the substrate without the occurrence of loose edges, and also without sticky parts occurring outside the transferred material.

This result is surprising, because the primer material is not used in the normal way, i.e. as a thin coating, but as a minor component in an adhesive composition.

A particular advantage of the present invention is that known and commercially available materials can be used.

Thus, the transparent varnish can contain usual film-forming components, such as acrylate resins, vinyl resins, cellulose resins, polyurethanes, etc. or suitable mixtures thereof. These resins are used in combination with suitable solvents, which of course should satisfy the requirements that they should have a sufficient dissolution power for the film-forming component and a volatility which permits them to evaporate from the applied coating within a reasonable time, i.e. a time which is neither so long as to make the drying operation unpractically lengthy, nor so short as to interfere with a proper applying of the layer. The skilled chemist will have no difficulty in choosing the solvent which is best suited for the situation at hand, and all this is well-known per se. Thus, it can be stated generally that glycols, glycol esters, glycol ethers, ketones, white spirits and similar solvents and combinations thereof can be used.

The colored layer or layers may be obtained from any composition which shows sufficient compatibility with the varnish layer. For practical purposes it is preferred to use the same composition to which the necessary amount of coloring material, usually a pigment, has been added.

The second transparent varnish layer again may be applied from any composition which is compatible with the first transparent layer and the colored layers, but as is well-known to the skilled chemist in this field, also for this layer it is preferred to use the same film-forming materials and solvents as in the first transparent varnish layer.

It should be repeated here that the novelty of this invention does not reside in the compositions of these layers and that any composition which is useful for this purpose and is within the reach of the skilled chemist can be used therefor.

According to the invention a modified adhesive composition is used. The adhesive itself again can be any adhesive useful for this purpose and usually some commercially available adhesive is used, with or without further diluents. Most of these adhesives are on acrylate base. According to this invention this adhesive is now modified by adding thereto a primer composition for the polyalkylene support. Such primers again are known materials which are commercially available. In the case the support is a polyethylene film or coating, a primer for polyethylene should be used, and of course, if the support is a polypropylene film or coating, a primer for polypropylene has to be chosen. If the support is a film or coating of a copolymer of ethylene and propylene, a primer for the homopolymer of the predominantly present monomer should be taken. If necessary, a mixture of primers may also be used.

The amount of primer composition should be a minor one, based on the adhesive, but within this conception may vary within broad limits. Of course, the amount of primer composition should be sufficient to obtain the desired effect in a sufficient measure, and on the other hand it should not be so great that the action of the adhesive or the quality of the final bond between image and substrate is affected. In general the amount of the primer composition for this purpose should be about 1 to 5% based on the adhesive composition, and preferably it is 2–4% and even more preferably around 3%. In view of the solids contents of the commercial adhesive and primer compositions this usually amounts to a primer content in the dried adhesive layer of generally about 0.1 to 0.5%, preferably 0.2 to 0.4% and more preferably around 0.3%.

After application and drying of the adhesive layer the transfer is finished and can be used at any time. Its shelf life is not affected by the primer, but depends primarily on the nature of the other materials applied, as is also well known in this art.

The following examples illustrate some embodiments of this invention, without, however, limiting it in any respect.

EXAMPLE I

A dry transfer was made of the letters "NL", the Dutch nationality sign for motor vehicles.

The support was a commercially available, 0.09 mm thick polypropylene sheet, at one side provided with an anti-blocking layer of polysiloxane, and having dimensions of 500×700 mm. To this support the various layers described below were applied. All layers were applied by screen printing, followed by drying at about 60° C. for 2 to 3 minutes.

(a) Transparent varnish, 33.5% solids.
- 20% Elvacite 2010, an acrylic resin sold by E. I. duPont de Nemours & Company, U.S.A.
- 10% VAGH, a vinylic resin sold by Union Carbide, U.S.A.
- 3% dioctyl phthalate (plasticizer)
- 0.5% Huile 47V300, a flowing aid sold by Rhône Poulenc, France
- 66.5% solvent, a 1:1 mixture of ethyleneglycol acetate and cyclohexanone.

(b) Black image layer. This layer is applied in the form of the letters "NL". The same varnish as above is used to which has been added 7% of carbon black.

(c) White background layer. This layer is applied again over the entire plane. The same varnish as for (a), but with the addition of 30% titania (rutile).

(d) Second transparent varnish layer: Same as (a). The contours of layers (a) and (d) extend a little beyond those of the image.

(e) Adhesive composition:

Hycar 2100X26, a pressure sensitive and laminating adhesive on acrylate basis, 50% solids in methylethylketone, sold by B. F. Goodrich Chemical Company, U.S.A. This commercial product was diluted with 50% of butylene glycol, and there was added 3% of Spezial-Primer PP 5133, a primer for polypropylene, sold by Worlee-Chemie Kunstharzfabrik, German Federal Republic. This product is sold as a toluene solution containing 5% solids. It is believed that this product is a chlorinated polyolefin, like has been disclosed by Eastman Kodak in Modern Plastics International, December 1973, page 4.

The Spezial-Primer PP 5133 was added as such, without further dilution.

The adhesive layer was applied in such a way that its contours extended somethat beyond that of layer (d).

After the adhesive layer had been dried the obtained transfer material was covered with a siliconated paper sheet. This was done routinely, because it is normally desired to be able to stack a large number of these transfer bodies on each other, and experience had shown that the anti-blocking layer on the back of the support not always performed ideally for large stacks.

With the aid of so obtained transfer material the Dutch nationality sign was applied to vehicle bodies. In all cases a perfect result was obtained.

Example II

A dry transfer was made of the Dutch flag (red, white and blue bars). The support was a commercially available, 0.09 mm thick uncoated polyethylene sheet having dimensions of 500×700 mm. To this support the following layers were applied in the same way as described in Example I.

(a) Transparent Varnish, 33.5% solids.
- 20% Neocryl 811, an acrylate resin sold by Polyvinylchemie, Waalwijk, Netherlands.
- 10% cellulose acetate butyrate
- 3% Uresin B, a plasticizer sold by Hoechst AG, German Federal Republic.
- 0.5% Huile 47V300 (the flowing aid of Example I)
- 66.5% solvent, a 5:2 mixture of ethyleneglycol acetate and butyleneglycol.

(b) Red layer over ⅓ of surface area in shape of bar:

The same varnish as above to which has been added 10% of Cromophtal vot GR, a red pigment sold by Ciba-Geigy, Switzerland.

(c) Blue layer in form of bar at other end of surface, also ⅓ of surface area.

The same varnish as for (a), but with the addition of 10% Irgalith Blau LGLD, a blue pigment sold by Ciba-Geigy.

(d) White layer over entire surface.

The same varnish as for (a), but with the addition of 30% titania (rutile).

(e) Second transparent varnish layer: Same as (a); the contours of layers (a) and (e) extend a little beyond those of the image.

(f) Adhesive compositions.

Lutonal I30 sold by BASF, German Federal Republic as 95% solution in gasoline. 100 parts thereof were diluted with 200 parts of xylene and 200 parts of Shellsol A (a solvent sold by Shell), and furthermore, 6 parts of the primer PE 5800, a primer for polyethylene, sold by Worlée-Chemie Kunstharzfabrik were added.

The adhesive layer was applied in such a way that its contours extended somewhat beyond that of layer (e).

The transfer material was further treated as in Example I.

With the aid of the so obtained transfer material flags were applied to car rear windows, car bodies, luggage, helmets and labels. In all cases perfect results were obtained.

What is claimed is:

1. Dry transfer material, comprising a support of a transparent polyalkylene, chosen from the group consisting of polyethylene, polypropylene, and ethylene-propylene copolymers, coated with a varnish layer, at least one printing ink layer forming the desired image, a second varnish layer and an adhesive layer, wherein said adhesive layer contains a primer for said polyalkylene and extends beyond the contours of said varnish layers.

2. The dry transfer material of claim 1, wherein said polyalkylene support is present as a coating on a cellulosic material.

3. The dry transfer material of claim 1, wherein said polyalkylene is polypropylene.

4. The dry transfer material of claim 1, wherein said polyalkylene is polyethylene.

5. The dry transfer material of claim 1, wherein said primer is present in an amount corresponding to 0.1 to 0.5% by weight of the adhesive.

6. The dry transfer material of claim 5, wherein said primer is present in an amount of 0.2 to 0.4% by weight of the adhesive.

7. The dry transfer material of claim 6, wherein said primer is present in an amount of around 0.3% by weight of said adhesive.

8. Transfer images obtained with the use of the dry transfer material of claim 1.

* * * * *